United States Patent
Hu et al.

(10) Patent No.: US 9,479,446 B2
(45) Date of Patent: Oct. 25, 2016

(54) HITLESS SERVICE IN A VARIABLE RATE OPTICAL TRANSPONDER

(71) Applicant: NEC Laboratories America, Inc., Princeton, NJ (US)

(72) Inventors: Junqiang Hu, Davis, CA (US); Konstantinos Kanonakis, New Brunswick, NJ (US); Ting Wang, West Windsor, NJ (US); Philip Ji, Cranbury, NJ (US)

(73) Assignee: NEC Corporation (JP)

( * ) Notice: Subject to any disclaimer, the term of this patent is extended or adjusted under 35 U.S.C. 154(b) by 135 days.

(21) Appl. No.: 14/479,398

(22) Filed: Sep. 8, 2014

(65) Prior Publication Data
US 2015/0071636 A1    Mar. 12, 2015

Related U.S. Application Data

(60) Provisional application No. 61/876,408, filed on Sep. 11, 2013.

(51) Int. Cl.
| | |
|---|---|
| H04J 3/16 | (2006.01) |
| H04J 14/00 | (2006.01) |
| H04L 12/825 | (2013.01) |
| H04B 10/40 | (2013.01) |
| H04Q 11/00 | (2006.01) |
| H04L 12/815 | (2013.01) |

(52) U.S. Cl.
CPC ............... *H04L 47/25* (2013.01); *H04B 10/40* (2013.01); *H04Q 11/0062* (2013.01); *H04L 47/225* (2013.01); *H04Q 2011/0086* (2013.01)

(58) Field of Classification Search
CPC  H04B 10/40; H04B 10/27; H04B 10/07953; H04B 10/50; H04B 10/60; H04B 17/00; H04Q 11/04; H04Q 11/0062; H04L 12/825; H04L 47/25; H04L 47/225; H04L 47/36
USPC ....... 398/52, 45, 162, 26, 27, 202–214, 135, 398/137, 16; 370/468, 395.21, 280, 294
See application file for complete search history.

(56) References Cited

U.S. PATENT DOCUMENTS

| | | | |
|---|---|---|---|
| 7,420,922 B2 | 9/2008 | Bruckman et al. | |
| 8,122,330 B2* | 2/2012 | De Lind Van Wijngaarden | H04L 1/0009 714/774 |
| 8,682,175 B2* | 3/2014 | Forghieri | H04B 10/07953 398/162 |
| 2008/0226289 A1* | 9/2008 | Meyer | G01M 11/00 398/16 |

OTHER PUBLICATIONS

Walker, T. "Optical Transport Network (OTN) Tutuorial" https://www.itu.int/ITU-T/studygroups/com15/otn/OTNtutorial.pdf. AMCC.Nov. 2004. pp. 1-62.

* cited by examiner

Primary Examiner — Hanh N Nguyen
(74) Attorney, Agent, or Firm — Joseph Kolodka

(57) ABSTRACT

Methods and systems for variable rate control include determining a new communications rate in response to measured data traffic patterns. A receive change message is transmitted to a receiver that triggers the receiver to wait for an end of transmission (EoT) message and to set a new communications rate. A transmit change message is transmitted to a transmitter that triggers the transmitter to send the EoT message to the receiver, to set the new communications rate, and to send a start of transmission (SoT) message to the receiver before resuming data communications.

7 Claims, 4 Drawing Sheets

HITLESS SERVICE IN A VARIABLE RATE OPTICAL TRANSPONDER

RELATED APPLICATION INFORMATION

This application claims priority to provisional application No. 61/876,408 filed Sep. 11, 2013, and the contents thereof are incorporated herein by reference.

BACKGROUND OF THE INVENTION

Internet traffic varies according to at least two scales: first, because of the emergence of new applications and the increasing number of Internet users, internet traffic increases exponentially when considered over long time periods (e.g., yearly) and, second, fluctuations in usage on smaller time scales (e.g., daily) occur. When upgrading networks, carriers provide for significantly higher bandwidth than needed to support expected traffic growth over the course of years. However, before each upgrade, carriers also require spectrum or bandwidth savings to ensure that the network will be able to operate into the future. Energy efficiency is also desirable to reduce operational costs, which in the case of power consumption will be roughly proportional to the traffic volume.

Recent technologies have improved the bandwidth efficiency of optical networks. Such technologies include optical signal to noise ratio (OSNR) adaptive modulation and Nyquist rate transponders as well as band switching in optical switches. Higher modulation formats also increase energy efficiency by reducing the symbol rate. However, these technologies are generally available only on static configurations. Whenever the network configuration—such as modulation format or symbol rate—needs to be changed, the connectivity will be temporarily interrupted and the customer will experience loss of data. Traffic-adaptive transport configuration is believed to reduce overall power consumption and to increase global network resource utilization, but the lack of hitless service provisioning prohibits the realization of these advantages.

BRIEF SUMMARY OF THE INVENTION

A receiver includes a variable rate transponder that provides data communications at a configurable rate. The receiver further includes a hitless service provisioning (HSP) module configured to set a new communications rate of the variable rate transponder in response to the receipt of an end of transmission (EoT) message and to trigger a resumption of communications at the new rate in response to the receipt of a start of transmission (SoT) message. The transponder receives a training pattern prior to receipt of the SoT message to train for a connection resumption A transmitter includes a variable rate transponder that provides data communications at a configurable rate. The transmitter also includes a hitless service provisioning module configured to trigger the transmission of an end of transmission (EoT) message, to set a new communications rate of the variable rate transponder, to trigger the transmission of a training pattern after setting the new communications rate, to trigger the transmission of a start of transmission (SoT) message, and to trigger a resumption of communications following transmission of the SoT message.

A method for variable rate control includes determining a new communications rate in response to measured data traffic patterns. A receive change message is transmitted to a receiver that triggers the receiver to wait for an end of transmission (EoT) message and to set a new communications rate. A transmit change message is transmitted to a transmitter that triggers the transmitter to send the EoT message to the receiver, to set the new communications rate, and to send a start of transmission (SoT) message to the receiver before resuming data communications.

DETAILED DESCRIPTION

Embodiments of the present principles provide a hitless solution doing transponder rate adjustment to avoid traffic loss. This allows frequent channel capacity tuning, which helps energy and network resource efficiency. The present embodiments use a centralized controller (CC) to coordinate a transmitter and receiver in a network. The CC first notifies the receiver to be prepared for transponder re-configuration, and then the CC signals the transmitter to reconfigure.

Figure 1:
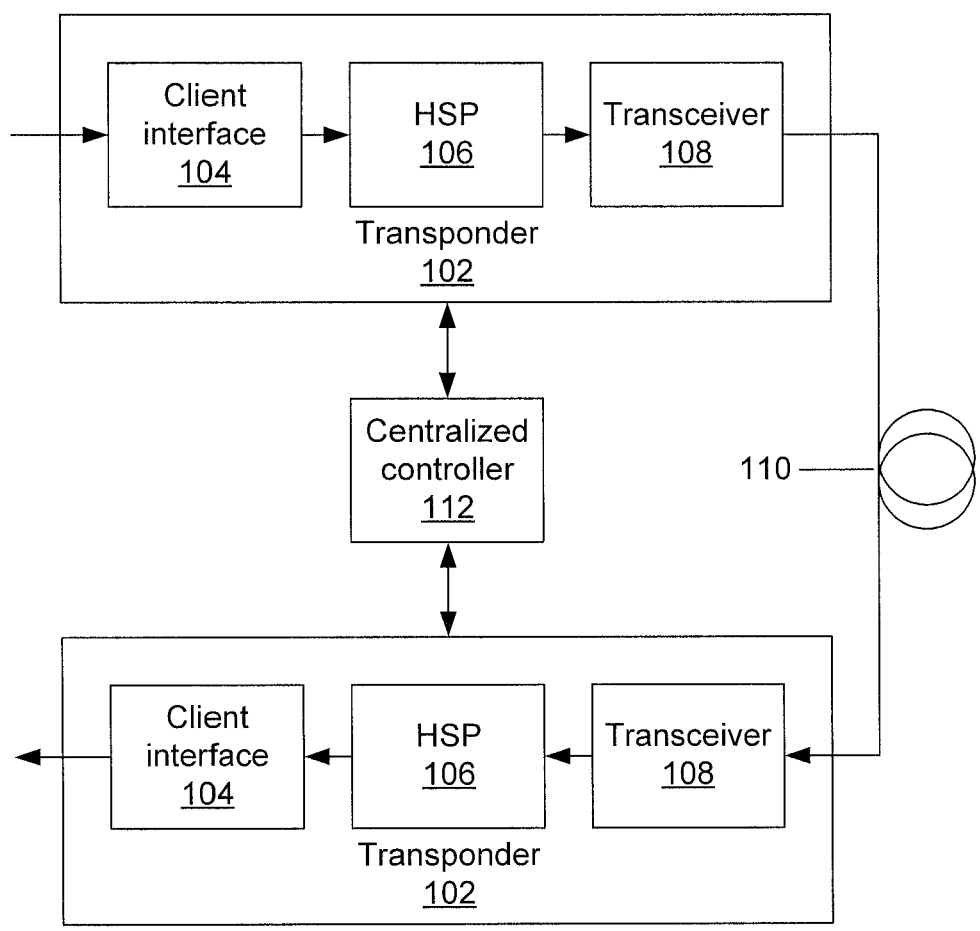
FIG. 1 is a block diagram of a variable rate optical communications system in accordance with the present principles.

Referring now to FIG. 1, a block diagram of a network is shown. The network includes two transponders 102 that communicate over a network 110. In the present examples it the network is described as being an optical network, with optical transponders 102 and an optical fiber 110 connecting them, but it should be understood that the present principles may be applied to other types of networks as well.

Each transponder 102 includes a client interface 104 that exchanges data with a client network. The client interface 104 receives, e.g., data from a network interface card and passes the data to a hitless service provisioning (HSP) module 106, which determines how to configure a variable rate optical transceiver (VROT) 108. The interface between the client interface 104 and the HSP 106 can be a framed continuous data stream, packets, or a time division multiplexing (TDM) data stream. The interface between the HSP and the VROT 108 is a data stream, such that the VROT 108 handles data to/from the HSP 106 transparently.

The VROT 108 is able to adjust transmission/reception rates while avoiding traffic loss, such that the transport rate matches the actual client traffic capacity, rather than the client line rate. By adapting to the client traffic capacity, the transponders 102 achieve both power and spectrum savings. To accomplish this, a CC 112 communicates with HSP modules 106 to coordinate rate changes. The present embodiments are applicable to both TDM and packet interfaces. Unless otherwise indicated, the term "frame" refers herein to the transmission unit of either TDM or packets.

The CC 112 may communicate with the transponders 102 through an out-of-band control channel. When the CC 112 determines that a rate change is needed, either dynamically upon traffic change detection or according to an updated provisioning decision, the CC 112 notifies the connected transponders 102. The CC 112 notifies the receiving transponder 102 about the configuration changes and then notifies the transmitting transponder 102 to perform such changes.

In both transponders 102, hitless service is controlled by HSP 106. Upon receiving a signal from the CC 112, the transmitter-side HSP 106 appends an end-of-transmission (EoT) pattern after finishing its current transmission to notify the receiver that it is to take action. The HSP 106 at the transmitting transponder 102 then reconfigures itself using the parameters given by the CC 112 and begins transmitting a training pattern (TP) for some pre-defined time period. The reconfiguration time plus the training period is greater than the reconfiguration and re-synchronizing time of the receiving transponder 102. The transmitter then sends a start-of-transmission pattern followed by a regular data stream to continue the communication.

On the receiver side, the HSP 106 at the receiving transponder 102 looks for the EoT message after each frame after receiving notification from the CC 112. When the EoT pattern is detected, the HSP 106 reconfigures the receiving VROT 108 using the parameters given by the CC 112 and waits for the TP. When the TP is detected, the receiving transponder 102 enters the trained state and begins looking for SoT, after which the receiving transponder 102 begins receiving regular data.

If there are repeaters (e.g., 3R regenerators) on the link 110 between transponders 102, their operation procedure is similar to the receiver, and notification from CC 112 to the receivers happens before the transmitting transponder 102 is notified. In such a case, the CC 112 triggers a TP that is long enough for all the intermediate repeaters and the destination transponder 102 to be synchronized sequentially. EoT, TP, and SoT messages are passed through by the repeaters so that each repeater or receiver can detect the patterns.

Some embodiments may omit the CC 112. In such an embodiment, the functions of the CC 112 may be performed by the transmitting transponder 102, with notification messages being sent in-band. The transmitter may therefore have the ability to monitor traffic, whether internally or by an external monitoring module. When notified to change the optical channel capacity, the HSP 106 in the transmitting transponder 102 passes such information to the receiving transponder 102 using control messages embedded in the data stream. For packet applications, such control messages may be framed and can be differentiated from regular data packets. For TDM services, there can be either additional bandwidth dedicated for control message, for example in a fixed time slot, or they may be transmitted using a field in the TDM frame header. For increased reliability, the receiver may send back an acknowledgment message to the transmitter, which would need a bidirectional communication channel.

Figure 2:
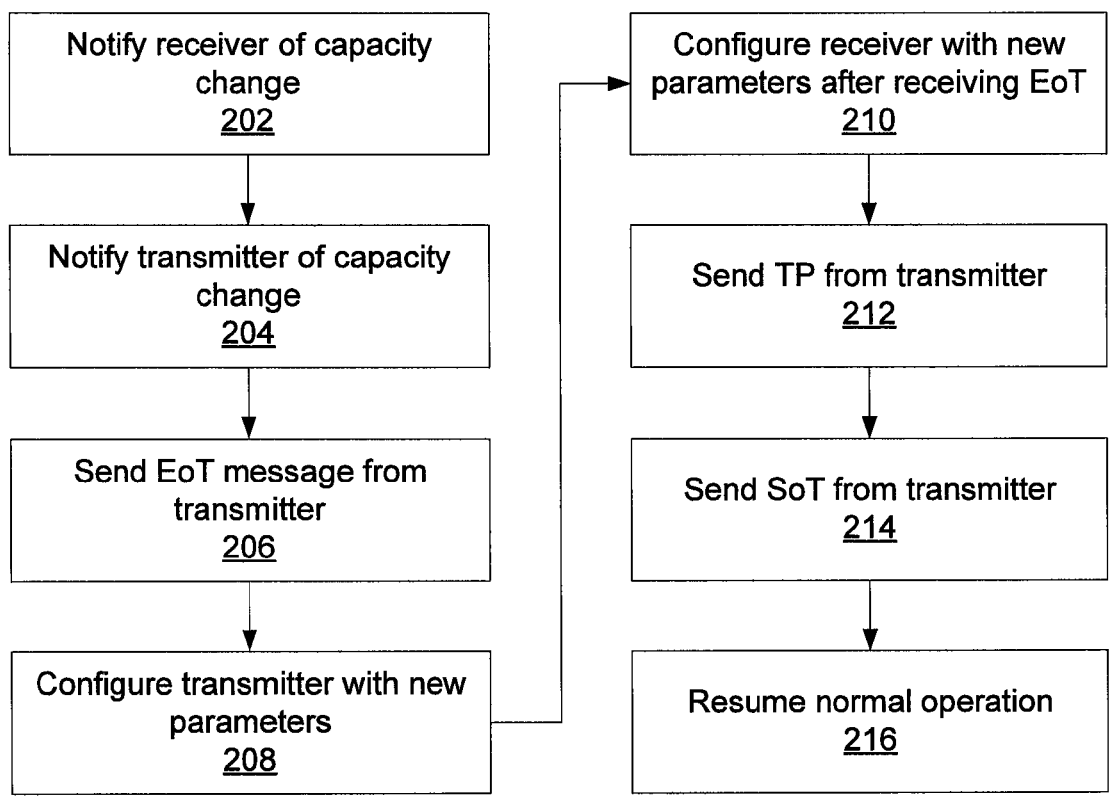
FIG. 2 is a block/flow diagram of a method for hitless service in an optical communications system in accordance with the present principles.

Referring now to FIG. 2, a method for hitless rate change is shown. At block 202, the CC 112 first notifies the receiving transponder 102 of a capacity change. The CC 112 then notifies the transmitting transponder 102 of the capacity change. The transponders 102 are notified in this order to ensure that the receiver will be listening for the EoT message sent by the transmitter in block 206. Block 208 then reconfigures the transmitter with the new transmission parameters. Once the receiver receives the EoT message in block 210, the receiver also reconfigures according to the parameters sent in block 202. After the transmitter is reconfigured, block 212 transmits a training pattern. After a predetermined time period, block 214 ends the TP and transmits the SoT message. When the receiver receives the SoT message, block 216 resumes normal operation.

When dealing with TDM streams, the data stream is usually encapsulated in time-delineated frames, where the timeslot of each frame identifies a flow. Typical examples of TDM technology include synchronous optical networks (SONET) and optical terminal networks (OTN). In TDM systems, a timeslot is always transmitted, no matter whether data is allocated to it or now. In the interest of power consumption and bandwidth savings, the present embodiments compress the TDM frame by removing unallocated time slows.

Thus, when changing rates in a TDM system, the CC 112 provides a new transmission schedule to the transponders that removes unused slots from an underfull TDM frame. The removed slots are replaced with data from clients that transmit traffic to keep the total frame size a constant length. The channel rate for individual client streams is therefore variable, as a stream will have a different number of slots allocated to it within the frame depending on how many other active clients there are. At the receiver side, the removed slots are stuffed and presented to the client interface 104 to maintain a constant data rate. This provides for non-adaptive clients to be used, as such clients will expect specific timing for the arrival of bits. The "stuffing" can simply be zeros, encrypted to provide a sufficient number of 0-1 transitions.

Figure 3:
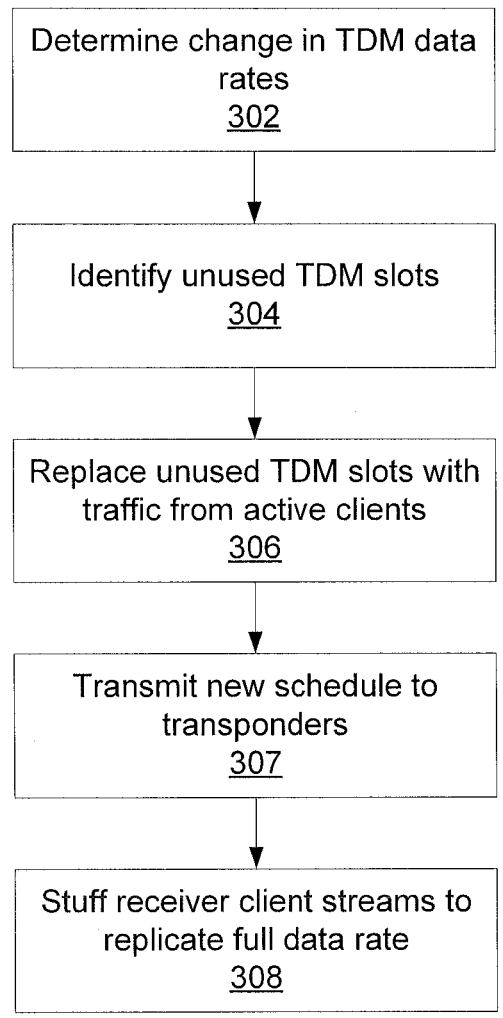
FIG. 3 is a block/flow diagram of a method for hitless service in a time division multiplexing optical communications system in accordance with the present principles.

Referring now to FIG. 3, a method for adjusting the rate of a TDM stream is shown. At block 302, the CC 112 determines that the TDM stream is underfull according to current data traffic. At block 304, the CC 112 identifies unused TDM slots in the stream and flags them for removal. At block 306, the CC 112 creates a new TDM schedule that replaces unused TDM slots with traffic from active clients. Block 307 transmits the new schedule from the CC 112 to the HSP modules 106 at the respective transponders 102. When the receiving transponder 102 receives the new TDM schedule, block 308 stuffs client streams to replicate the full data rate, so as to remain compliant with TDM protocol mandates.

TDM slot allocation information can be obtained and managed from a software defined network (SDN) controller or generalized multi-protocol label switching (GMPLS) controller that is responsible for TDM channel setup and tear down. In the case of an SDN controller, the SDN controller can play the role of the CC 112. In the case of a GMPLS controller, the GMPLS controller itself will not play that role alone, but can work with another controller to perform the functions of the CC 112. Whenever there is a new allocation, the system will be notified and the actual allocation happens after the aforementioned line rate adjustment completes. The release happens before the adjustment.

In a TDM service, for the period after the transmitter sends the EoT in block 206 until the transmitter sends the SoT in block 214, there is no valid data being sent from the transmitter to the receiver. However, TDM services often require continuous data stream transmission without any interruption, which means the TDM frame is continuously received from the client interface 104 at the transmitter side and is continuously presented to the client interface 104 at the receiver side.

One solution is to provide data buffering and delayed output at the receiver side. When the receiver system is started and synchronized, the received frame(s) or part of a frame will be buffered before being sent out. The buffer time covers the data stream interruption during reconfiguration. The selection of the buffer time is therefore related to the initial starting bandwidth (or data rate) and the tuning steps/bandwidth. The buffer time is minimized to reduce service latency and buffering resource requirements, while still providing enough of a buffer to eliminate any possible interruption during rate changes. In one embodiment, there are a fixed number of tuning steps that correspond to different frame configurations, and each has a pre-defined bandwidth. For example, in a frame having sixteen slots, rates for a client may be zero (where no slots are allocated) through sixteen times the rate of a single slot (where all slots are allocated to the client).

When changing to a lower data rate, data arriving at the transmitter is merely buffered until transmission resumes. When changing to a higher data rate, however, the transmitter needs to catch up to the transmitted capacity. The transmitting transponder 102 uses the old compression method at the new data rate for the first p frames, where p is obtained by calculation or by explicit notification or is controlled by the transmitter itself The transmitter may then reduce the compression ratio when the transmitter buffer is empty.

Regardless of whether the data rate was increased or decreased, the receiver decompresses the read out frames the same way they were compressed. Because the client interface 104 of the transmitter has a constant data rate and a continuous data stream, and because the aforementioned operation in the transmitter guarantees no overflow or underflow, the receiver will not encounter overflow or underflow as long as the initial frame output delay is set correctly.

The channel bandwidth can be characterized as a set $BW[i]$, $i=1,2,\ldots,n$, where n is the number of different rates that can be selected and where $BW[i]>BW[j]$, $\forall i>j$. For simplicity of description, it is further assumed that there is a fixed tuning time T to change from one rate to another, although this may be generalized to a variable tuning time. For the transmitter side, before sending out the EoT, a given stream is transmitted at a rate $BW[k]$. When changing to a lower rate, after configuration and sending out the SoT message, the transmitter uses a new rate $BW[k-j]$, where $1 \leq j \leq k-1$. Correspondingly, for frames received before EoT, the receiver reads at data rate $BW[k]$, which is also the rate that the receiver uses during the reconfiguration period. The frames received after the SoT message will be read out at the new rate $BW[k-j]$. Thus the maximum required buffer size will be $\sum_{j=1}^{n-1} BW[j]*T + BW[1]*T$, which occurs when the system started with bandwidth $BW[n]$, is tuned step-by-step to $BW[1]$, and is then tuned to any higher bandwidth.

Consider the case where the system starts with $BW[k]$, where $k \in [1:n]$. When the system reduces bandwidth to $BW[k-j]$ ($1 \leq j < k$), during the line interface interruption period, the receiver reads at a rate $BW[k]$, so the buffer capacity for a single step will be $BW[k]*T$. For this situation, $k=n$ gives the minimum buffer size needed to start from any bandwidth.

When managing a packet-based service, the packets' arrival and departure do not need to be continuous, so the only requirement is to pass packets out without accumulation in the buffer and without overflow or significant delays. For this purpose, when bandwidth reduces, actual traffic capacity is reduced before transponder bandwidth adjustment. The controller 112 first reduces the traffic capacity by, e.g., controlling the connected client interface 104 at the transmitting transponder 102 and then notifies the transponder 102 to reduce bandwidth. When bandwidth increases, actual traffic capacity is increased after the transponder bandwidth adjustment and after the transponder has emptied buffered packets.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
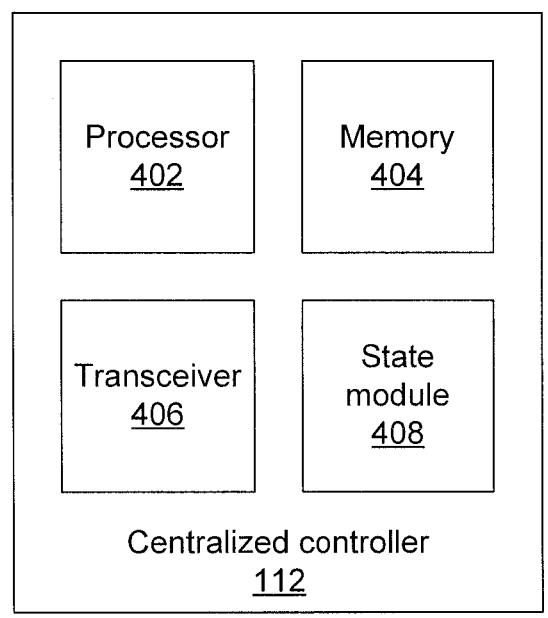
FIG. 4 is a block diagram of a centralized controller for an optical communications system in accordance with the present principles.

Referring now to FIG. 4, a diagram of the CC 112 is shown. The CC 112 includes a processor 402, memory 404, and a transceiver 406. A state module 408 works in conjunction with the memory to maintain the present state of the optical communications system based on updated information provided by the transceiver 406. Based on the information maintained by state module 408, the processor 402 determines whether current conditions indicate that the communications rate should be changed. If a change is needed, the processor 402 instructs the transceiver 406 to send the above-described messages to the transponders 102 and causes state module 408 to update the state of the system in memory 404.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A receiver, comprising:
   a variable rate transponder that provides data communications at a configurable rate; and
   a hitless service provisioning (HSP) module configured to set a new communications rate of the variable rate transponder in response to the receipt of an end of transmission (EoT) message and to trigger a resumption of communications at the new rate in response to the receipt of a start of transmission (SoT) message,
   wherein the transponder receives a training pattern prior to receipt of the SoT message to train for a connection resumption;
   wherein the HSP module is further configured to set the new communications rate based on received instructions from a centralized controller and receive the instructions prior to reception of the EoT message.

2. The receiver of claim 1 wherein the HSP module receives the instructions on an out-of-band channel different from that on which the variable rate transponder operates.

3. The receiver of claim 1 wherein the HSP module receives the instructions on an in-band channel that the transponder uses for data communication.

4. A transmitter, comprising:
   a variable rate transponder that provides data communications at a configurable rate; and
   a hitless service provisioning (HSP) module configured to trigger the transmission of an end of transmission (EoT) message, to set a new communications rate of the variable rate transponder, to trigger the transmission of a training pattern after setting the new communications rate of the variable rate transponder, to trigger the transmission of a start of transmission (SoT) message, and to trigger a resumption of communications following transmission of the SoT message;
   wherein the HSP module is further configured to set the new communications rate based on received instructions from a centralized controller and receive the instructions prior to reception of the EoT message.

5. The transmitter of claim 4, wherein the HSP module receives the instructions on an out-of-band channel different from that on which the variable rate transponder operates.

6. The transmitter of claim 4, wherein the HSP is further configured to determine the new communications rate and to trigger the transmission of the new communications rate on an in-band channel that the transponder uses for data communications.

7. The transmitter of claim 4, wherein the HSP is further configured to continue the transmission of the training pattern for a duration that exceeds an expected time of receiver reconfiguration.

* * * * *